United States Patent
Cunningham et al.

[11] Patent Number: 5,785,933
[45] Date of Patent: Jul. 28, 1998

[54] SULFURIC ACID ALKYLATION REACTOR SYSTEM WITH STATIC MIXERS

[75] Inventors: Brian A. Cunningham, Doylestown, Pa.; Saverio G. Greco, Princeton Junction, N.J.

[73] Assignee: Mobil Oil Corporation, Fairfax, Va.

[21] Appl. No.: 779,290

[22] Filed: Jan. 21, 1997

[51] Int. Cl.$^6$ ............................................. B01F 5/00
[52] U.S. Cl. .................. 422/224; 422/215; 422/228; 422/234
[58] Field of Search ...................... 422/224, 205, 422/211, 215, 228, 234; 585/723-725, 730-731, 921, 924

[56] References Cited

U.S. PATENT DOCUMENTS

| | | | |
|---|---|---|---|
| 4,236,036 | 11/1980 | Dixon et al. | 585/723 |
| 4,383,977 | 5/1983 | Hutson, Jr. et al. | 422/235 |

*Primary Examiner*—Hien Tran
*Attorney, Agent, or Firm*—Thomas W. Steinberg; Malcolm D. Keen

[57] ABSTRACT

A sulfuric acid-catalyzed alkylation reactor system is provided for alkylating isoparaffins with olefins to produce hydrocarbon alkylates. The reactor vessel has a vertical cylindrical wall, a top, an inverted conical bottom portion, internal perforated baffles and multiple emulsion injection inlet pipes, disposed tangentially to and communicating with the interior of the reactor vessel. The emulsion injection inlet pipes have static mixers incorporated therein and tangential injection of the emulsion imparts a circular motion to the contents of the reactor vessel, resulting in partial phase separation of the reacted products. The reactor vessel communicates with a settling vessel through a transfer pipe having a vertical portion suspended within the central portion of the reactor vessel and a horizontal portion sealably extending through the cylindrical wall of the reactor vessel. The transfer pipe has a first end near the conical bottom portion of the reactor vessel and a second end at a top portion of the settling vessel. The reactor system enables a sulfuric-acid catalyzed reaction of olefins with isoparaffins utilizing static mixing of the reactants, and minimizing leakage of the reactants to the environment.

11 Claims, 5 Drawing Sheets

SULFURIC ACID ALKYLATION REACTOR SYSTEM WITH STATIC MIXERS

FIELD OF THE INVENTION

In gasoline manufacture, it is known to alkylate short-chain isoparaffins with short-chain olefins, in the presence of an acid catalyst, to obtain longer-chain branched paraffins with an increased octane rating. However, handling of the acid catalyst causes environmental and safety concerns, due to the possibility of leaks in the reactor system.

The present invention reduces the possibility of leaks in the reactor system, by reducing the number of moving parts entering or exiting the reactor, which must be sealed against acid and hydrocarbon leakage.

BACKGROUND OF THE INVENTION

Worldwide economic development has resulted in increasing demand for petroleum energy products, especially gasoline. However, health and safety concerns with respect to the aromatic content of gasolines may result in a decrease in octane rating of gasolines in the absence of other sources of high-octane blend stocks. Additionally, increasing phaseout of lead-based additives around the world exacerbates the problem of maintaining sufficient octane rating of gasolines for proper engine performance.

A class of petroleum-derived compounds known to have particularly high octane ratings are branched paraffins, having from about 6 to 12 carbon atoms. Unfortunately, the amount of naturally occuring $C_{6-12}$ branched paraffins in crude petroleum is limited and is insufficient to meet the increasing demand for high octane blend stocks. Accordingly, the petroleum industry has developed methods for synthesizing branched paraffins from existing materials to supplement the naturally existing supply of such high-octane materials.

One important method of obtaining branched $C_{6-12}$ paraffins, termed "alkylates", is by acid catalyzed alkylation of short-chain isoparaffins with short-chain olefins, derived from various refinery processes. Presently, two commercially successful acid catalyzed alkylation systems are being utilized: A sulfuric acid catalyzed system and a hydrofluoric acid (HF) catalyzed system.

Each system has its benefits and detriments. The sulfuric acid catalyzed system is conducted at low-temperatures, from about 2° to 70° C., while the HF catalyzed system is conducted at ambient to elevated temperatures, from about 20° to 40° C. Therefore, the sulfuric acid catalyzed system is relatively more complex and energy intensive, requiring some source of refrigeration of the reactants and/or the reactor to work effectively.

Unfortunately, the high reactivity of HF also means that it is extremely corrosive, requiring the use of unusually inert (and expensive) materials of construction in the reactor system. In contrast, the relatively lower reactivity of sulfuric acid, combined with its much lower vapor pressure, means that sulfuric acid catalyzed systems are more easily and less expensively built and maintained. Still, sulfuric acid is hardly innocuous, being itself highly reactive and corrosive, and the larger volume of sulfuric acid catalyst necessary for use in sulfuric acid catalyzed alkylation systems raises significant concerns with respect to liquid leakage.

Two major designs of sulfuric acid reactor systems are currently in use, both of which were developed in the 1940's and have received few major improvements in the ensuing years. Both major systems, the horizontal contactor (FIG. 4), commonly known as the effluent refrigeration system, and the cascade reactor (FIG. 5), commonly known as the Cascade Auto Refrigeration system, employ stirrers or impellers 30 with externally mounted motors and rotating shafts running into the reactor vessel, which must be sealed against leakage to the ambient environment. The stirrers are used to create and maintain an emulsion within the system, assuring maximum reactive surface area and intimate contact between the reactants and the catalyst, so as to maximize the reaction efficiency. Notably, the horizontal contactors of FIG. 4, which are usually used in pairs due to their limited capacities (2500 BPSD), may potentially leak at the large diameter shaft seals. Likewise, in the Cascade Auto Refrigeration reactor of FIG. 5, which typically employs 5 to 7 stirrers, potential for leakage exists at each stirrer shaft seal.

Accordingly, isolation of the reactor contents from the ambient environment is difficult to maintain, especially at the seals around the rotating shafts of the stirrer motors.

Therefore, it would be advantageous and desirable to reduce or eliminate the number of moving parts entering the alkylation reactor system which must be sealed against leakage, such as rotating motor shafts, while maintaining an emulsion within the reactor to maximize reaction efficiency.

SUMMARY OF THE INVENTION

A first object of the present invention is to provide a sulfuric acid alkylation reactor system having few or no moving parts entering the reactor which must be sealed against leaks to the ambient environment.

A second object of the present invention is to provide a safer sulfuric acid alkylation reactor system in which, in the event of a leak to ambient, the system can be easily and rapidly shut-down, so as to minimize the volume of the leak.

A third object of the present invention is to provide a sulfuric acid alkylation reactor which is less expensive to build and maintain, relative to existing reactor systems, and also has a lower operating cost.

A fourth object of the present invention is to provide a sulfuric acid alkylation reactor system in which some degree of phase separation is achieved between the sulfuric acid and hydrocarbon phases of the reaction products, so as to increase the efficiency of the phase separation step, and thereby the overall efficiency of the system.

The above objects are realized in that in one embodiment of the present invention, a sulfuric acid-catalyzed alkylation reactor system is provided for alkylating isoparaffins with olefins, to produce hydrocarbon alkylates. The reactor vessel has a vertical cylindrical wall, a top, an inverted conical bottom portion and internal perforated baffles, and communicates with a settling vessel for separating the sulfuric acid from the alkylate through a transfer pipe having a vertical portion suspended within the central portion of the reactor vessel and a horizontal portion sealably extending through the cylindrical wall of the reactor vessel. The transfer pipe has a first end near the conical bottom portion of the reactor vessel and a second end at a top portion of the settling vessel. Multiple emulsion injection inlet pipes are disposed tangentially to and communicate with the interior of the reactor vessel, for injecting emulsified reactants into the reactor vessel.

In another embodiment, the present invention is directed to a process for alkylating at least one isoparaffin with at least one olefin, in the presence of sulfuric acid catalyst, to produce a hydrocarbon alkylate. A first liquid stream comprising the isoparaffin(s) is combined with a second liquid stream comprising sulfuric acid and the combined streams are passed through at least one static mixer to form an isoparaffin/sulfuric acid emulsion stream. A third liquid stream comprising the olefin(s) is combined with the isoparaffin/sulfuric acid emulsion stream and the further combined streams are passed through at least one static mixer to form an olefin/isoparaffin/sulfuric acid emulsion stream. The olefin/isoparaffin/sulfuric acid emulsion stream is injected into a reactor vessel having a vertical cylindrical wall, in a direction tangential to the cylindrical wall and with sufficient force to impart a circular motion to the olefin/ isoparaffin/sulfuric acid emulsion within the reactor vessel, wherein the olefin is reacted with the isoparaffin to form a hydrocarbon alkylate/isoparaffin/sulfuric acid mixture.

BRIEF DESCRIPTION OF THE DRAWINGS

The above and other objects, features and advantages of the present invention will be better understood from the following detailed descriptions taken in conjunction with the accompanying drawings, all of which are given by way of illustration only, and are not intended to be limitative of the present invention.

DETAILED DESCRIPTION OF THE INVENTION

The following detailed description of the invention is provided to aid those skilled in the art in practicing the present invention. Even so, the following detailed description of the invention should not be construed to unduly limit the present invention, as modifications and variations in the embodiments herein discussed may be made by those of ordinary skill in the art without departing from the spirit or scope of the present inventive discovery.

Figure 1:
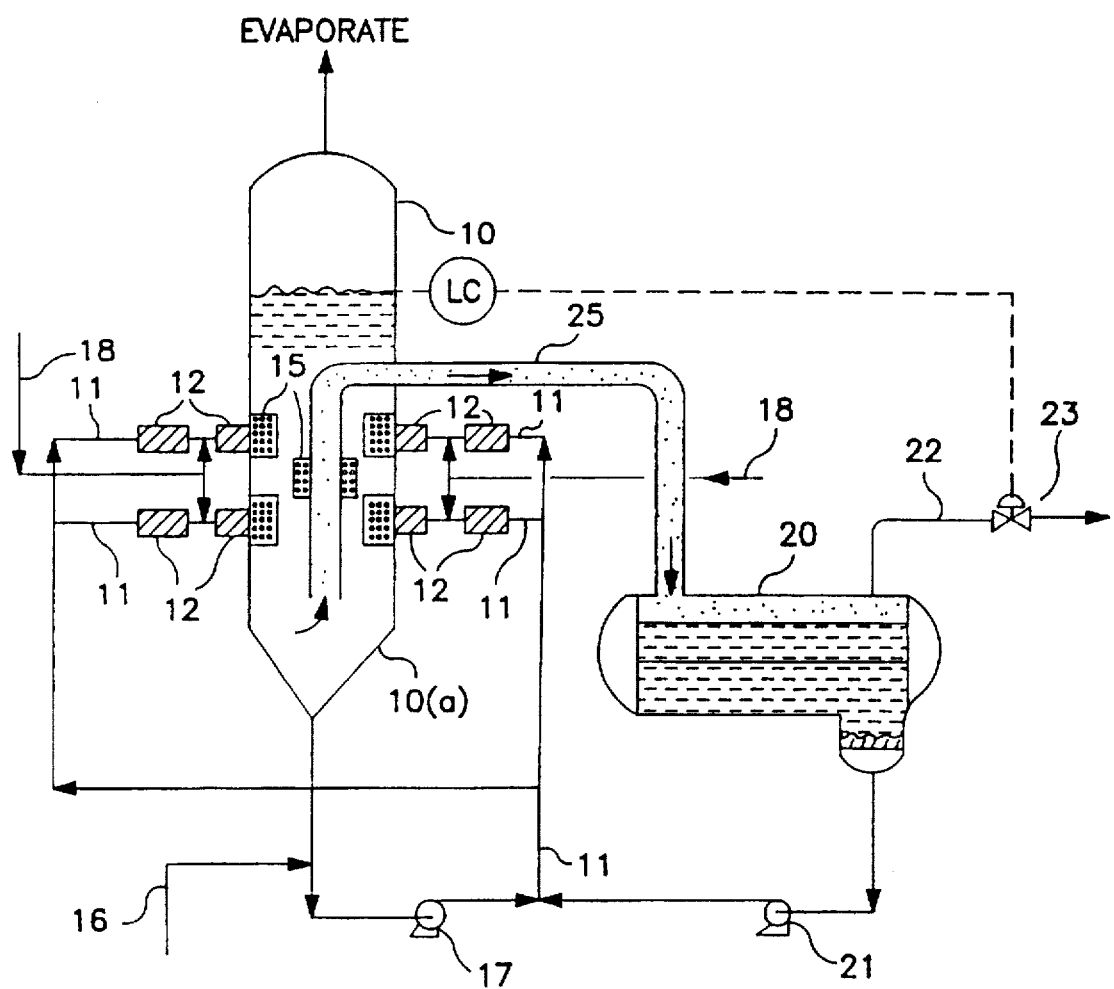
FIG. 1 is a cross-sectional diagram of the sulfuric acid alkylation system of the present invention.

The reactor system of the present invention is illustrated in FIG. 1, and incorporates a vertical, cylindrical reactor vessel 10 with an inverted conical bottom portion 10a, having disposed centrally therein a vertical portion of a U-shaped transfer pipe 25, with a first end disposed toward the inverted conical bottom portion 10a, for transfer of reacted materials and catalyst to a separator vessel 20. Ideally, the vertical portion of the transfer pipe is disposed coaxially with the axis of the cylindrical reactor vessel. The horizontal run of the transfer pipe extends through the vertical wall of the reactor vessel, and is sealed against leakage at its contact points with the vertical wall. The other vertical portion of the transfer pipe 25 empties into the phase separation vessel 20, wherein the mixed emulsion of sulfuric acid catalyst and hydrocarbon reaction products, including the desired alkylate, are left to settle and separate, based upon the differences in specific gravities between the two phases.

Figure 2:
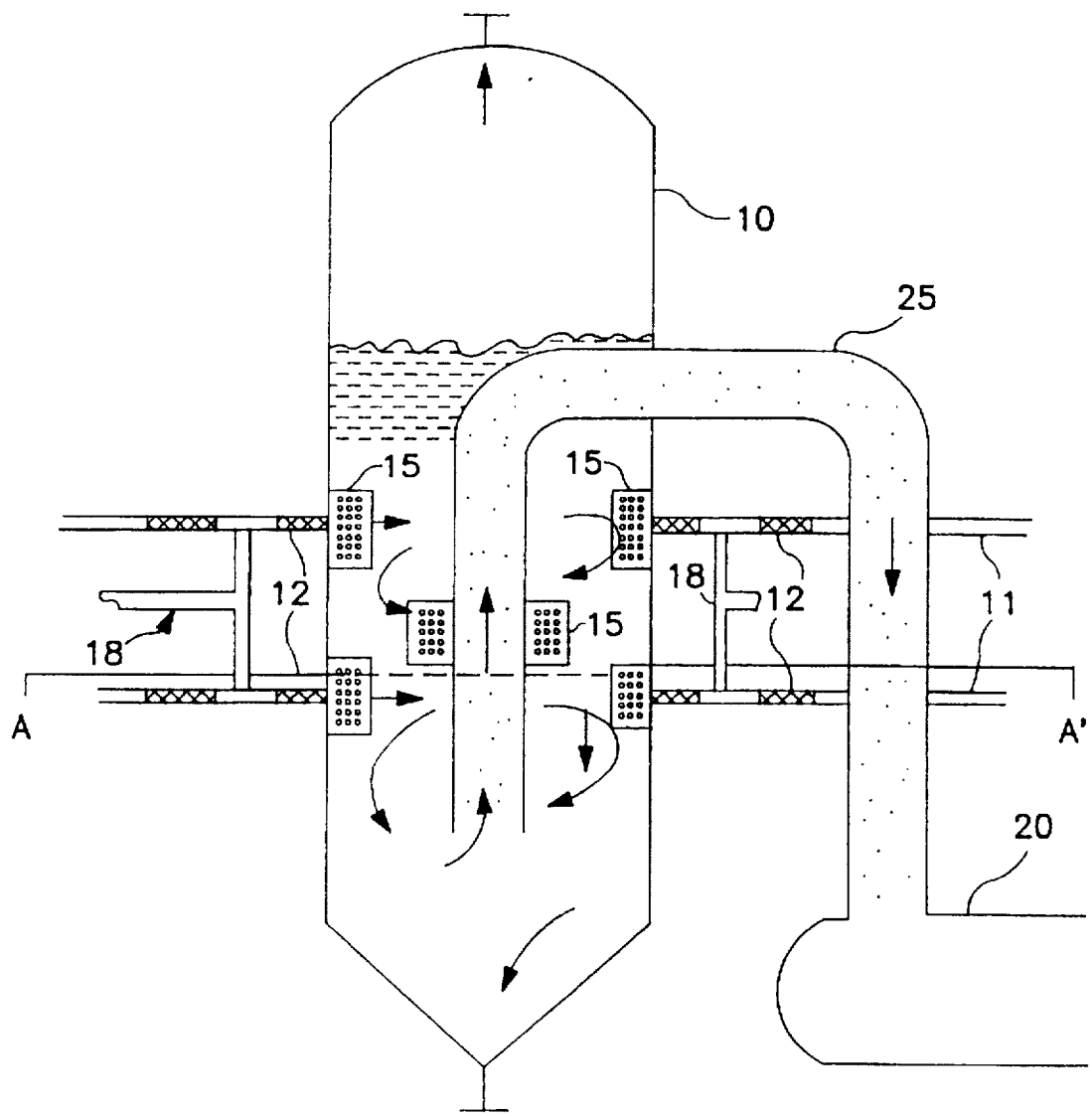
FIG. 2 is an enlargement of the cross-section of the reactor vessel of the present invention.

The reactants for the system are derived from separate sources within a typical refinery, which are conventional and not depicted. The incoming isoparaffin, typically isobutane, passes from the isoparaffin source, not shown, through line 16, and combines with a sulfuric acid-rich emulsion exiting the inverted conical bottom portion of the reactor. The combined isoparaffin/sulfuric acid stream passes through emulsion pump 17, which partially emulsifies the stream by the action of the pump impeller, and is further combined with the relatively pure sulfuric acid stream recycled from the bottom of the separator tank 20, and pumped through the acid pump 21, which effects further emulsification. The combined isoparaffin/sulfuric acid stream then passes through the injection inlet pipe 11, which splits into multiple injection inlet ports near the reactor vessel 10. Each of the injection inlet pipes has disposed therein at least two static mixers 12 in series, more clearly illustrated in FIGS. 2 and 3. The combined isoparaffin/sulfuric acid stream passes through at least one, but preferably multiple static mixers, so as to maximize the emulsification of the isoparaffin and sulfuric acid. Downstream of the static mixers the olefin inlet line(s) 18 injects the olefin, typically butene, into the isoparaffin/sulfuric acid emulsion through a nozzle which disperses the olefin into small droplets. The thus-combined stream is passed through at least one more static mixer, to form an olefin/isoparaffin/sulfuric acid emulsion. The total number of static mixers in each injection inlet line may vary, but is preferably four: One or three before and one or three after the olefin inlet line connection.

Figure 3:
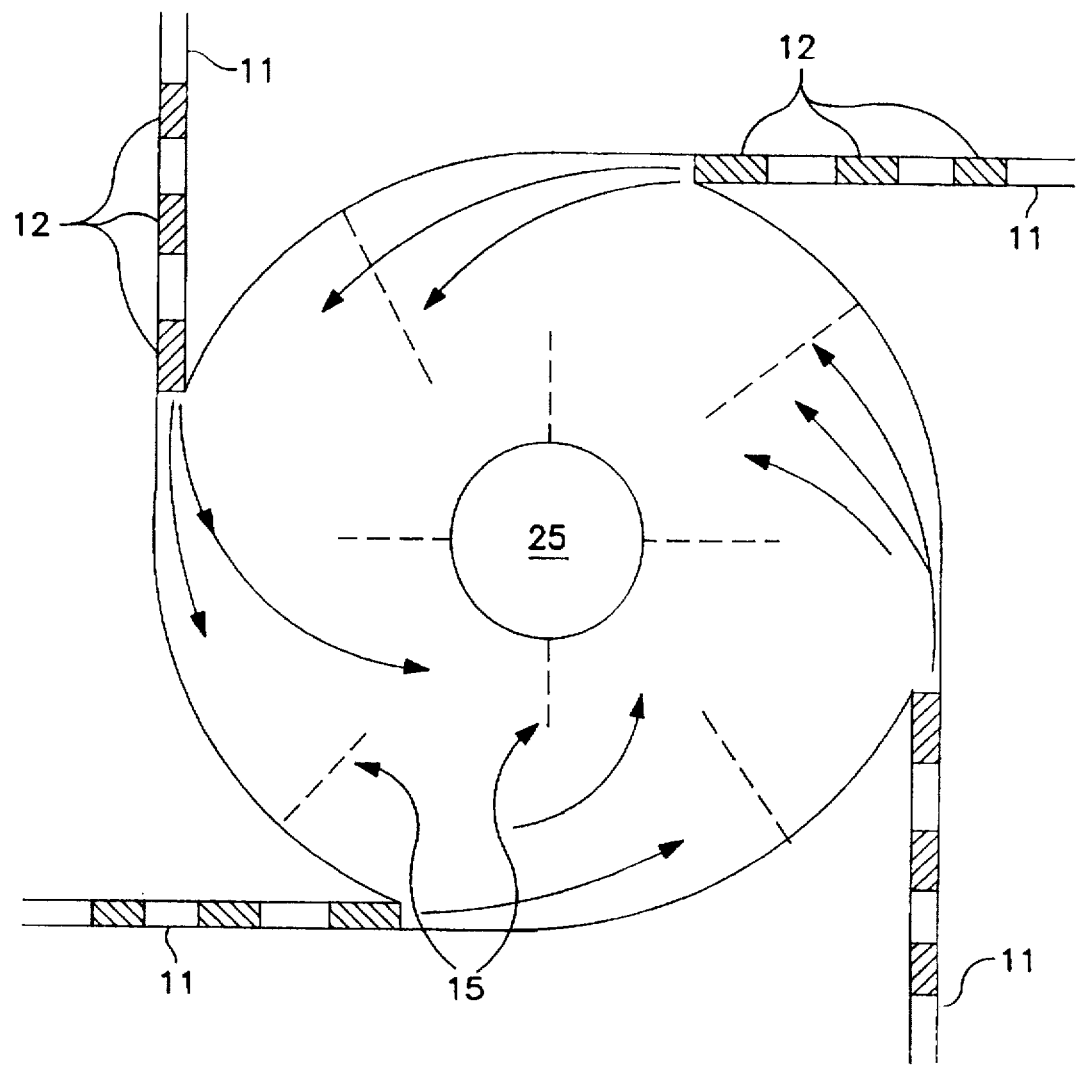
FIG. 3 is a horizontal section along line A-A' of FIG. 2, which illustrates the internal arrangement of the elements in the reactor vessel of the present invention.
Figure 4:
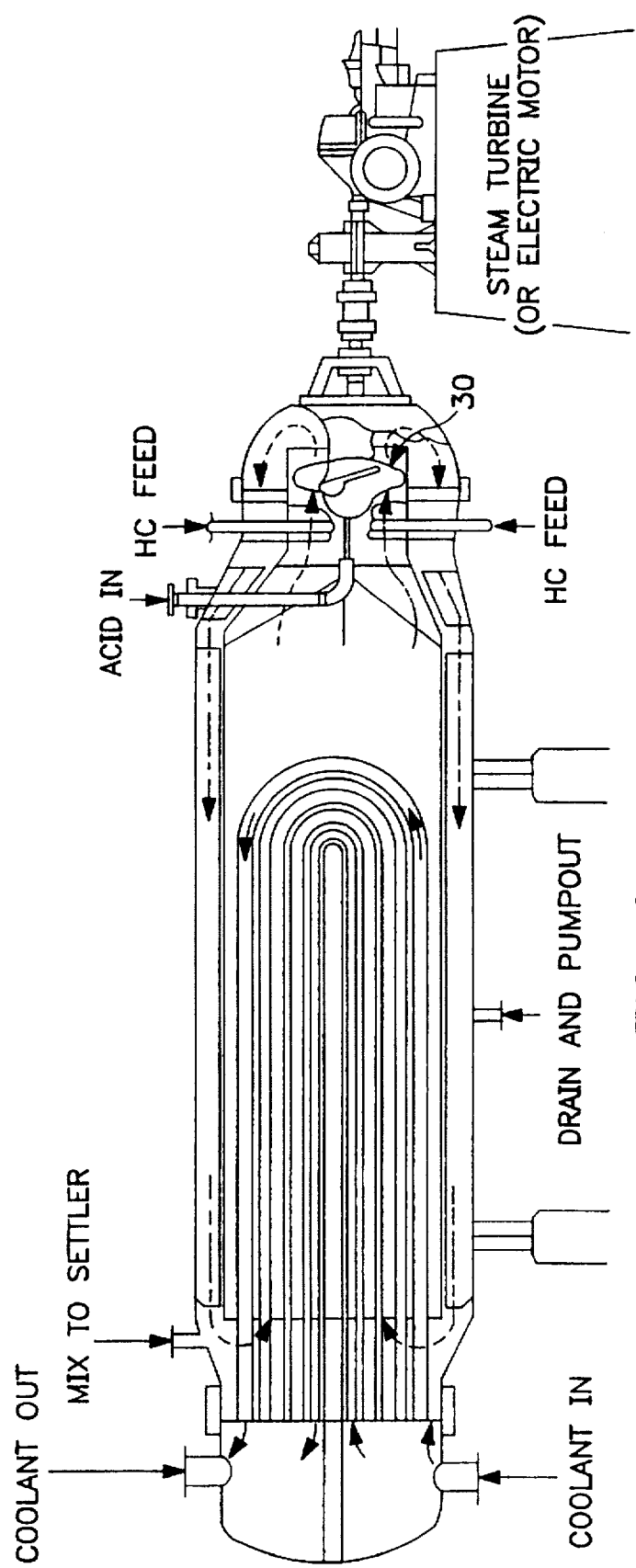
FIG. 4 is a cross-sectional diagram of the prior art horizontal contactor sulfuric acid alkylation reactor system.
Figure 5:
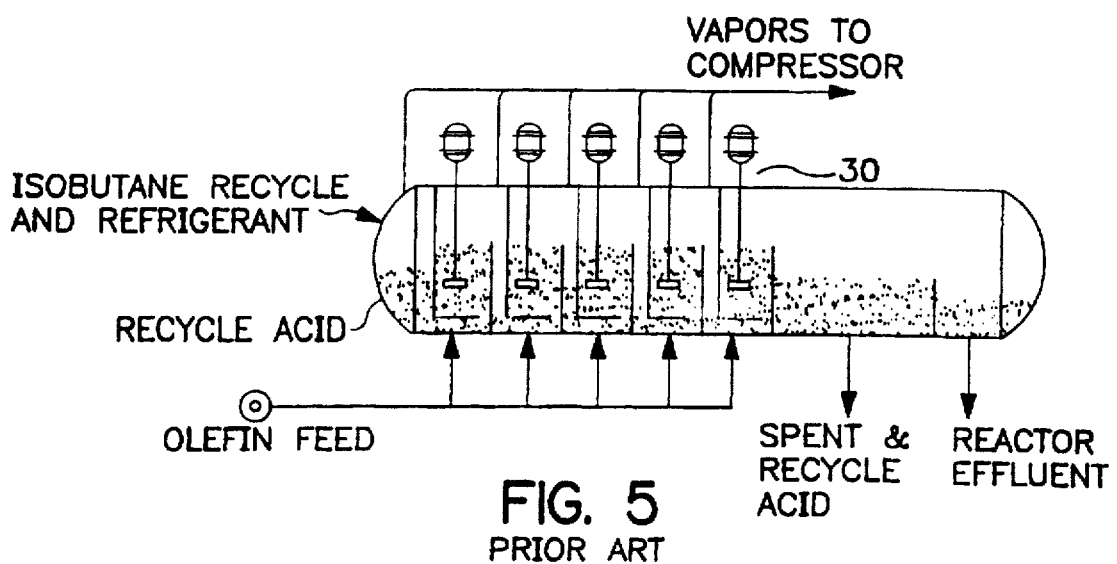
FIG. 5 is a cross-sectional diagram of the prior art cascade sulfuric acid alkylation reactor system.

As illustrated in FIG. 3, the injection inlet pipes are arranged tangentially around the cylindrical reactor vessel, and the emulsified reactant stream enters the reactor vessel with sufficient force and velocity to impart a circular motion to the emulsion within the reactor vessel. A suitable reactant stream velocity is about 13 ft/sec. Within the reactor vessel are a number of perforated baffles 15, extending radially inward from the reactor vessel wall, or radially outward from the central transfer pipe, or preferably both radially inward from the reactor vessel wall and radially outward from the central transfer pipe. The perforated baffles act to further increase shear and mixing so as to maintain the reactants in the emulsified state within the reactor vessel, as the circulating emulsion contacts and passes through the baffle perforations.

In the process according to the present invention, at least one isoparaffin is alkylated with at least one olefin, in the presence of sulfuric acid catalyst, to produce hydrocarbon alkylates. A first liquid stream comprising the isoparaffin(s) is combined with a second liquid stream comprising sulfuric acid and the combined streams are passed through at least one static mixer to form an isoparaffin/sulfuric acid emulsion stream. A third liquid stream comprising the olefin(s) is combined with the isoparaffin/sulfuric acid emulsion stream and the further combined streams are passed through at least one static mixer to form an olefin/isoparaffin/sulfuric acid emulsion stream, which is injected into a reactor vessel having a vertical cylindrical wall, in a direction tangential to the cylindrical wall and with sufficient force to impart a circular motion to the olefin/isoparaffin/sulfuric acid emulsion within the reactor vessel, wherein the olefin(s) is reacted with an excess of the isoparaffin(s) to form a hydrocarbon alkylate/isoparaffin/sulfuric acid mixture. It is believed that a majority, if not all, of the olefin is reacted within the last static mixer, although the inventors do not wish to be held to this theory.

Typically, the olefin feed is derived from one or more existing refinery processors, such as the fluidized catalytic cracker (FCC), a thermal cracking reactor or the coker. Any short chain olefin selected from $C_{2-5}$ olefins, such as ethene, propene, 1-butene, 2-butene, pentenes or mixtures thereof are suitable as the olefin reactant feed stream, although the butenes are preferred.

The isoparaffin feed is derived from naturally occuring isoparaffins isolated in the refining of crude petroleum, such as isobutane, or is derived from various refinery processors, such as the FCC, coker, hydrocracker or the reformer. While isobutane is a preferred isoparaffin, the liquid fuel value of which is limited by its vapor pressure, other isoparaffins may be used, either alone or in combination with isobutane.

Therefore, the nature of the olefin and isoparaffin feeds is in theory limited only by the fact that the desired alkylate products should have boiling points within the gasoline fraction boiling range, from about 40° to about 200° C.

Reaction parameters of the present invention are essentially the same as in the existing sulfuric acid alkylation systems. Acid to hydrocarbon ratio is about 1:1, while it is preferred that a large excess of isoparaffins relative to olefins be present, to maximize olefin conversion to alkylates. Typically, the isoparaffin:olefin ratio should be from about 4:1 to 10:1, preferably 8:1 or greater. Reaction temperatures are subambient, ranging between about 2° to 10° C., with cooling provided by evaporation of the isoparaffin from the surface of the reaction emulsion within the reactor vessel. Preferably, all cooling is provided by evaporation of the isoparaffin from the surface of the reaction emulsion. The evaporate is withdrawn from the top of the vessel, fed to a compressor, condensed and recycled into the system.

In contrast to the existing sulfuric acid catalyzed alkylation processes, the olefin, the isoparaffin and the sulfuric acid enter the reactor vessel of the present invention as an emulsion, rather than being mixed in the reactor vessel in the first instance. As the emulsion of the present invention circulates within the reactor vessel, it is maintained in the emulsion state by passing through the perforated baffles in the reactor to complete the alkylation reaction. That is, the static mixers and baffles, in combination with the emulsion and acid pumps, provide the mixing energy for forming the reactant emulsion, thus minimizing moving parts in the present system. In fact, moving parts are eliminated within the reactor vessel itself.

In further contrast to previously-known processes, the circular motion of the emulsion within the reactor vessel, in combination with the inverted conical bottom portion of the reactor vessel, acts to partially phase-separate the sulfuric acid and hydrocarbon phases of the emulsion toward the bottom of the vessel due to the centrifugal force imparted to the emulsion and the greater specific gravity of the sulfuric acid phase. That is, upon moving into the bottom of the reactor vessel, where the perforated baffles are absent, increased residence time is provided so that the heavier sulfuric acid phase tends to concentrate toward the bottom portion of the vessel. This effect is enhanced by the inverted conical shape of the bottom of the reactor vessel, wherein the angular velocity and therefore the centrifugal force on the circulating acid-rich emulsion is increased.

Accordingly, the hydrocarbon/sulfuric acid mixture passing into the transfer tube or pipe 25 from the bottom of the reactor vessel is already enriched in the hydrocarbon phase, requiring less settling time in the settling tank 20 and/or a smaller settling tank. Phase separation is completed in the settling tank, with the less dense alkylate-containing hydrocarbon phase floating to the top and being collected through line 22. Any unreacted isoparaffin may be removed by flash-off or distillation, to recover the alkylate. As the process is a continuous one, level control within the system is optionally maintained by a level controller LC, the output of which is fed to control valve 23 (FIG. 1).

Therefore, the sulfuric acid alkylation reactor of the present invention satisfies the stated objects of the present invention by eliminating moving parts which penetrate the reactor vessel, and the sealing surfaces therefor, by statically mixing the reactants and catalyst prior to their entry into the reactor vessel, and maintaining the emulsion within the vessel by static mixing through the perforated baffles. As such, the reactor system of the present invention is less expensive to build, run and maintain than previous reactor systems. And since the only moving parts which are likely to leak are the seals associated with the emulsion and acid pumps, leakage can be readily stopped by shutting down the pumps and isolating them by conventional automatic shut-off valving, thus minimizing leakage volume. In contrast, the two prior art systems will continue to leak until the entire system is depressurized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A sulfuric acid alkylation reactor system for alkylating at least one isoparaffin reactant with at least one olefin reactant, in the presence of sulfuric acid catalyst, to produce hydrocarbon alkylates, comprising:

a reactor vessel having a vertical cylindrical wall, a top, an inverted conical bottom portion and internal perforated baffles;

a settling vessel for separating said sulfuric acid catalyst from said alkylate;

a transfer pipe having a vertical portion suspended within the central portion of said reactor vessel and a horizontal portion sealably extending through said cylindrical wall of said reactor vessel and communicating with said settling vessel, said transfer pipe having a first end disposed toward said inverted conical bottom portion of said reactor vessel and a second end at a top portion of said settling vessel; and multiple emulsion injection inlet pipes for injecting reactants into said reactor vessel, disposed tangentially to and communicating with the interior of said reactor vessel.

2. The reactor system according to claim 1, wherein said internal perforated baffles extend radially inward from said cylindrical wall.

3. The reactor system according to claim 1, wherein said internal perforated baffles extend radially outward from said transfer pipe.

4. The reactor system according to claim 1, wherein said internal perforated baffles extend radially inward from said cylindrical wall and radially outward from said transfer pipe.

5. The reactor system according to claim 1, further comprising at least one static mixer disposed within each emulsion injection inlet pipe.

6. The reactor system according to claim 5, wherein said at least one static mixer comprises multiple static mixers disposed within each emulsion injection inlet pipe.

7. The reactor system according to claim 1, further comprising at least one emulsion pump having an inlet communicating with said conical bottom portion of said reactor vessel and an isoparaffin source and an outlet communicating with said emulsion injection inlet pipes, for pumping a mixture of said isoparaffin reactant and said sulfuric acid catalyst through said emulsion injection inlet pipes.

8. The reactor system according to claim 7, further comprising at least one olefin inlet line communicating between an olefin source and said emulsion injection inlet pipes.

9. The reactor system according to claim 6, further comprising at least one emulsion pump having an inlet communicating with said inverted conical bottom portion of said reactor vessel and an isoparaffin source and an outlet communicating with said emulsion injection inlet pipes, for pumping a mixture of said isoparaffin reactant and said sulfuric acid catalyst through said emulsion injection inlet pipes.

10. The reactor system according to claim 9, further comprising at least one olefin inlet line communicating between an olefin source and said emulsion injection inlet pipes and connected to said emulsion injection inlet pipes between said multiple static mixers.

11. The reactor system according to claim 1, further comprising at least one acid pump having an inlet communicating with a lower portion of said settling vessel and an outlet communicating with said emulsion injection inlet pipes, for pumping sulfuric acid catalyst recovered from said settling vessel through said emulsion injection inlet pipes.

* * * * *